US011516192B2

(12) United States Patent
Fou

(10) Patent No.: US 11,516,192 B2
(45) Date of Patent: Nov. 29, 2022

(54) SYSTEM AND METHOD FOR COMBINATORIAL SECURITY

(71) Applicant: Augustine Fou, New York, NY (US)

(72) Inventor: Augustine Fou, New York, NY (US)

(*) Notice: Subject to any disclaimer, the term of this patent is extended or adjusted under 35 U.S.C. 154(b) by 271 days.

(21) Appl. No.: 16/721,233

(22) Filed: Dec. 19, 2019

(65) Prior Publication Data

US 2021/0194859 A1      Jun. 24, 2021

(51) Int. Cl.
*H04L 9/40* (2022.01)
*H04L 51/18* (2022.01)
*H04L 51/046* (2022.01)

(52) U.S. Cl.
CPC ........ *H04L 63/0442* (2013.01); *H04L 51/046* (2013.01); *H04L 51/18* (2013.01)

(58) Field of Classification Search
CPC ... H04L 63/0442; H04L 51/046; H04L 51/18; H04L 51/24; H04L 63/10; H04L 51/066
USPC ........ 713/181, 167, 184, 171, 202; 709/231, 709/226, 223, 249, 201
See application file for complete search history.

(56) References Cited

U.S. PATENT DOCUMENTS

| | | | | |
|---|---|---|---|---|
| 6,240,183 B1* | 5/2001 | Marchant | ............ | G06F 12/1408 380/28 |
| 9,100,702 B2* | 8/2015 | Barton | .................. | H04N 9/8042 |
| 2003/0043764 A1* | 3/2003 | Kim | ...................... | H04L 1/1896 370/329 |
| 2004/0062389 A1* | 4/2004 | Etienne | ...................... | H04L 9/14 380/28 |
| 2006/0098874 A1* | 5/2006 | Lev | .......................... | G06K 9/42 382/182 |
| 2006/0167940 A1* | 7/2006 | Colton | .................... | G11B 20/00 |
| 2006/0239513 A1* | 10/2006 | Song | ..................... | H04L 65/403 382/115 |
| 2007/0100701 A1* | 5/2007 | Boccon-Gibod | .... | G06Q 20/202 705/21 |
| 2009/0017765 A1* | 1/2009 | Lev | ........................ | G06K 9/228 455/66.1 |
| 2011/0255841 A1* | 10/2011 | Remennik | .......... | H04N 21/4325 386/248 |
| 2011/0314278 A1* | 12/2011 | Taskaya | .............. | H04L 63/0428 713/167 |
| 2012/0109829 A1* | 5/2012 | McNeal | ............... | G06Q 50/265 705/67 |
| 2013/0152160 A1* | 6/2013 | Smith | ..................... | H04L 63/20 726/1 |

(Continued)

FOREIGN PATENT DOCUMENTS

CN            101047889 A  * 10/2007   ....... H04L 29/12047

*Primary Examiner* — Thuong Nguyen
(74) *Attorney, Agent, or Firm* — John L. Sotomayor

(57) ABSTRACT

A system and method for the creation of combinatorial security is herein presented. The security of the transmission of a message from sender to receiver is strengthened if there is no direct transmission between the parties. The system provides for transforming an incoming message into an alphanumeric content object, segmenting or sharding that object, encrypting each shard with a unique encryption algorithm, and storing each shard into an unknown number of network server. A recipient is provided with a message notification that permits the recipient to retrieve and reconstruct the message content with no direct communication between the sender of the message and the recipient of the message.

20 Claims, 3 Drawing Sheets

(56) References Cited

U.S. PATENT DOCUMENTS

| | | | |
|---|---|---|---|
| 2014/0164774 A1* | 6/2014 | Nord | G06F 21/6218 |
| | | | 713/171 |
| 2015/0302218 A1* | 10/2015 | Fielder | G06F 21/6209 |
| | | | 713/193 |
| 2017/0005787 A1* | 1/2017 | Weaver | G16B 30/10 |
| 2017/0006064 A1* | 1/2017 | Agarwal | H04L 9/3263 |
| 2018/0062880 A1* | 3/2018 | Yu | G06F 11/0709 |
| 2018/0062923 A1* | 3/2018 | Katrekar | H04L 63/0272 |
| 2018/0205976 A1* | 7/2018 | Xue | H04N 21/24 |
| 2019/0052697 A1* | 2/2019 | Wu | G06K 7/10881 |
| 2019/0267036 A1* | 8/2019 | Albertson | H04L 9/3297 |
| 2019/0278890 A1* | 9/2019 | Koval | G06F 21/14 |
| 2020/0334434 A1* | 10/2020 | Raymond | G06N 20/00 |
| 2021/0184852 A1* | 6/2021 | Feinberg | H04L 9/085 |
| 2021/0194859 A1* | 6/2021 | Fou | H04L 63/0442 |

* cited by examiner

SYSTEM AND METHOD FOR COMBINATORIAL SECURITY

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Messaging on the Internet continually evolves to accommodate new services and new systems for connecting users via messaging applications. Communication is a constant need among individual users for sharing information of all types. The messaging services utilizing the Internet, however, are inherently non-secure from a message content standpoint unless additional actions have been taken to provide some measure of message and data security when communicating over the public Internet.

Applications such as Telegram, WhatsApp, Signal and others have attempted to provide some measure of security for messages transmitted across the public Internet. However, inevitably, these applications become targets for hackers and other bad actors who intercept messages sent between users to unwrap the information contained in these messages for personal gain. Part of the issue is that hackers and other bad actors are remarkably patient in planning and executing exploits against such messaging services to break into the protocol used and capture messages. It can often take months for a bad actor to construct a solution to break into the security protocol being used by the messaging service, but once the bad actor has broken in all message traffic becomes an open book to the bad actor.

Messaging applications thus must continually evolve their security protocols to detect and close the vulnerability. However, until the vulnerability is discovered, all message traffic transmitted utilizing the messaging application is available to the bad actor. Additionally, once the exploit being used by the bad actor is no longer effective, the bad actor begins to immediately search for another vulnerability. In this arms race of designing new security measures for messages and bad actors breaking into the security measures, the stakes continue to increase and both the security measures and hacks by bad actors become more sophisticated.

However, the one basis that neither the messaging application nor the bad actors can change is the fact that they each take advantage of the public Internet. Current security measures for messaging also use commonly available solutions for encryption, message construction, and message transmission. Thus, vulnerabilities may be discovered by bad actors doing their homework and experimenting with the same protocols and methods used by the messaging application platforms when exercising the protocols and methods over time. A need exists for devising and implementing a security protocol for messaging that utilizes the Internet Protocol (IP) as a base transmission pipe, while making the message traffic traveling through the pipe too expensive in terms of computation time for bad actors to compromise.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
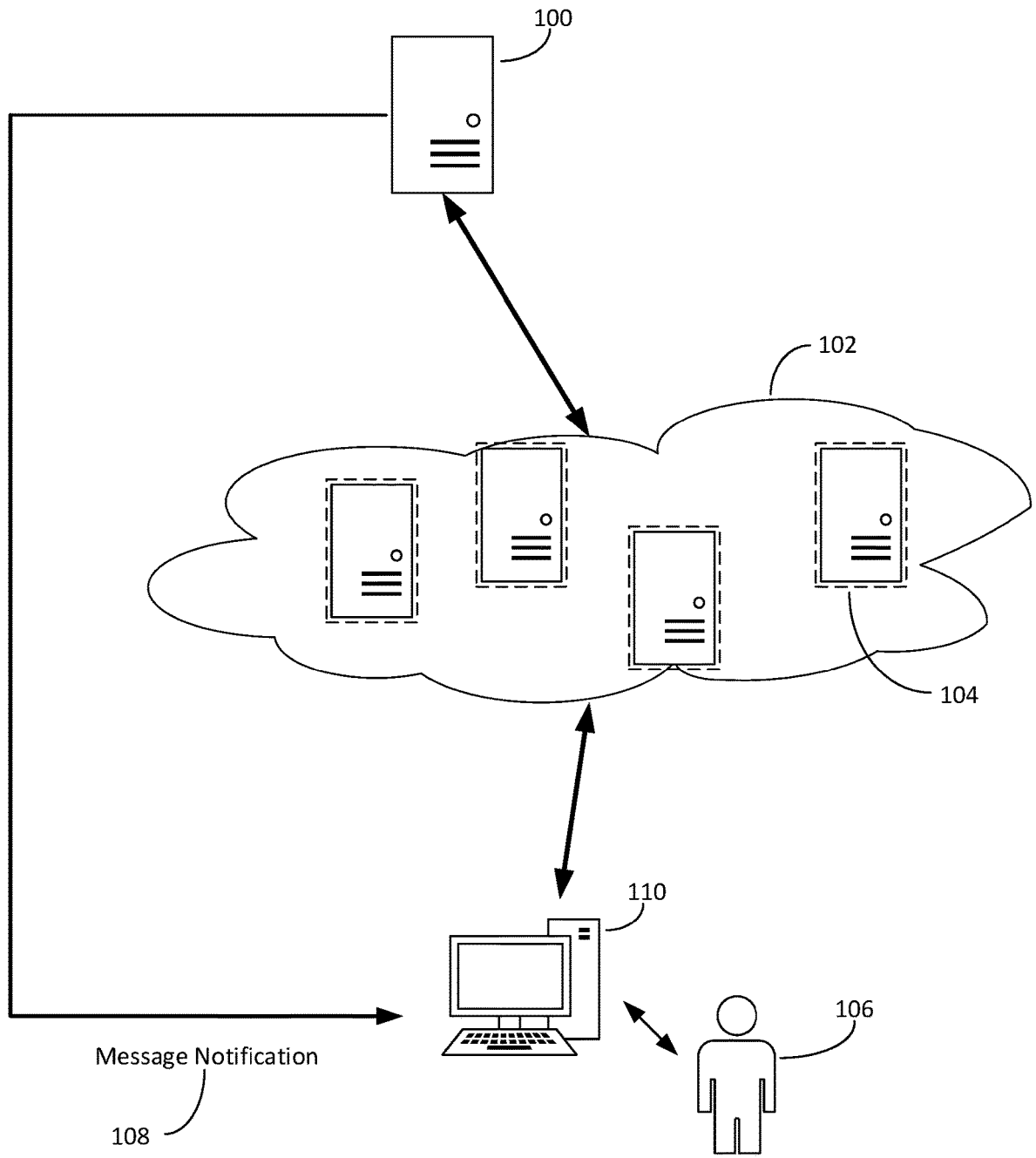
FIG. 1 is a view of an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "IP" refers to the Internet Protocol, the standard data transmission protocol used by the public internet.

Reference throughout this document to "combinatorial encryption" refers to the system and method of creating and transmitting secure message traffic utilizing the steps described in this document.

Reference throughout this document to "shard" refers to the sections into which a message is broken such that the reconstruction of the message and its data content requires the reassembly of all shards associated with that message.

Reference throughout this document to a "haystack" refers to an IP addressable server into which the system server of the innovation may allocate one or more sub-directories into which a shard may be stored. The IP addressable servers may exist in the cloud and are connected to the system server of the innovation through networked communication.

Reference throughout this document to "message notification" refers to a notification communication that is transmitted from the system server of the innovation and contains encrypted information permitting the recipient of the notification to retrieve and access a message.

Reference throughout this document to an "encryption algorithm" refers to any of a set of custom generated algorithms, which will be formulated as two-way mathematical algorithms, from which the system server may select the algorithm to be used to encrypt shards and/or message notifications.

The innovation described in this document presents a combinatorial security platform and process for use in securing communications from interception and disclosure to any party other than the intended recipient of the communications. At issue in any communication such as email, text messaging, or any other message transfer protocol across the internet is that a message may be intercepted during the transmission from sender to receiver. This interception may occur during the transmission of a message or may be retrieved from the message queue of the sending party or the receiving party. In either situation an actor other than the legitimate sender or receiver is in possession of the message content.

Security can be enhanced by incorporating time as an element to be overcome in intercepting and grabbing the content in messages from a sending party to a receiving party. Time is the only immutable commodity. Adding things that just take time to do, such as traversing a directory structure to get to a shard can extend the time necessary for an attacker to intercept and retrieve messages. Attackers would have to brute force the directory traverse and decryption of the alphanumeric strings contained in the shards.

Entropy is randomness and language has lower entropy than alphanumeric strings, because there is more order to language than alphanumeric strings. Thus, transmuting a message composed in a language into simple alphanumeric strings increases entropy in message content, increasing the security of such messages. Attackers may look for areas of low entropy for further study in attempts to defeat the encryption into which message content has been secured. The message content before decrypting with a recipient's single use final private key will be in alphanumeric string form. Even if an attacker were able to break the encryption on the message content, the attacker can't tell anything about the message from the alphanumeric string as opposed to language and cannot resurrect the message content just from the alphanumeric string that represents the message content.

Current systems address this vulnerability through various modes of encryption of message content, secure message wrappers placed around the message prior to transmission, securing the protocol for message transmission, and other methods for obscuring, encoding, and protecting content from access by unauthorized actors. Current encryption technology is continually under attack from outside actors who seek access to the content being communicated between a sender and a receiver. As new encryption, obfuscation, and secure algorithms and protocols are created, hackers and other bad actors are continually working to break the security method employed to reveal the message content for their own use.

The combinatorial security platform described in this document does not rely on the transmission of message content directly from a sender to a receiver. This novel system and method for the secure transmission of message content from a sender to a receiver uses a proprietary messaging platform and novel encryption process. The messaging platform and novel encryption process together provide the basis for combinatorial security for message content. The platform and process create a situation where there are so many possible combinations for transporting, encrypting, storing, retrieving and decrypting any secure message content that an attacker will run out of time to solve all parts of retrieving, decrypting, and reconstructing any captured message content before the message is picked up by an intended recipient. In a non-limiting implementation, when the message is picked up by the intended recipient all portions of the message content are permanently removed from any publicly available network sites and the content resides solely with the recipient.

Assuming attackers can bring extreme amounts of computer power to the issue of breaking the message encryption this system creates an ever expanding set of message segments, storage positions, unique encryption algorithms, and retrieval requirements to expand the time required to collect, decrypt, and reconstruct any message to the point where this process is greater than the computer power available to perform the message processing. The system also places time gates into the process. In a non-limiting example, sub-directory lookup takes a determinate amount of time and can't be shortcut; the sub-directories wherein message segments are stored must be identified and accessed, requiring a finite, measurable amount of time. Adding in this time element changes whether an attacker can complete all of the steps before message is picked up. Additionally, simply breaking one message segment or message does not provide the ability to break other messages, because each message is treated as a new message with no connection to any other message. In this non-limiting example, the message exists for a pre-set amount of time after the message notification is transmitting to a user for them to retrieve. If the pre-set amount of time is exceeded with no retrieval of the message, the connections to the storage locations and all message segments are deleted and the message is no longer retrievable.

In an embodiment, the concept of combinatorial security is enabled by the system being capable of creating an unlimited number of unique encryption algorithms, which makes it very difficult to know which of the created unique encryption algorithms is being used to encrypt any message or message segment. If greater message security is needed, the system may create more time use through the creation of more encryption algorithms, more sub-dirs to traverse, and more data servers in which to store and hide message segments, also known as shards.

As an initial step, the combinatorial security system receives content that a sender wishes to include in a communication, or message, to a recipient. The message content may be any type of content, including text, video, audio, multimedia, data files, data directories, or any other type of content that a sender wishes to transmit over networked communication channels. The system server initiates a pre-processing action in which the received content is treated as an object having a wholly alphanumeric representation of the content. This alphanumeric object may then be broken into an unknown number of shards, wherein each shard may be of a non-constant length such that the shards may not be of uniform size. In a non-limiting alternative implementation, shards may also be created of uniform size. After the content is broken into the unknown number of shards each of the shards is then encrypted with a selected, custom encryption algorithm. These encryption algorithms are not hash algorithms or ciphers, but are two-way mathematical constructs for use in encrypting each shard. The system may construct an unlimited number of mathematical transforms for use as encryption algorithms. The system may determine the number of encryption algorithms to create on a dynamic basis, as needed, even if the number of encryption algorithms to be created is much larger than the number of shards to be encrypted. There is no need for the system to create or maintain a table or database containing previously created encryption algorithms. However, the system may create and store encryption algorithms for later retrieval and use, or may create an unlimited number of encryption algorithms dynamically as needed. Regardless of the method of encryption algorithm creation, the system selects and uses a different encryption algorithm in the encryption of each created shard.

Subsequent to the creation of the unknown number of shards and the selection of an encryption algorithm for each shard, each shard may then be stored into one of an unknown number of servers. Each selected server may be any server having an IP address, regardless of operating system. Each server is uniquely addressed in the cloud by the IP address associated with that server. The system may navigate to each server in the cloud utilizing the IP address associated with that server and open a communication channel with that server. The system may then create any number of sub-directories, from one to any number that may be chosen to enhance obfuscation. The sub-directories are simply alphanumeric sub-directories of any alphanumeric length for the identifier of the sub-directory. This identifier may be of any length up to the naming limit for sub-directories within the selected server.

The system may then store one or more shards within selected sub-directories, chosen from the list of created sub-directories, and close the communication channel with the server. The system retains the IP address of the server and the created sub-directory in association with the shard, or shards, stored within the created and selected sub-directory(s). In this configuration, the server is referred to as a "haystack" because the system may create an unlimited and unknown number of sub-directories within the server in which to store the shard. The shards are thus distributed among a large and unknown number of servers. Within the servers the shards are distributed among a large and unknown number of sub-directories within each server, thus placing the shards within an unknown number of "haystacks".

At this point all shards containing the encrypted alphanumeric content have been distributed among an unknown number of "haystacks". The server may then construct a notification message that contains all of the information needed for the user to decode and understand how to retrieve the message for later reconstruction and decryption. The server may then transmit this message as a "right to view" invitation to the intended recipient.

Unlike email servers where a message travels from one sending server to one receiving server, in this system no portion of the message content committed to the system by the sender is actually sent from the sender to the recipient. The encrypted shards that contain the original message content remain in the cloud. Inventor calls this a "right to view" as opposed to the message being sent from point A to point B, from sender to recipient. At any point in time, prior to the message being picked up by the intended recipient, the sender can rescind, or un-send, the message. This permits erasure of the message and all shards prior to receipt should the sender wish to cancel the message. This is because the message is never "sent", simply distributed as shards into the cloud until the recipient picks up the message.

The system may then transmit a notification to the recipient that they have a message to be retrieved. Once again, the notification is sent to the recipient as a "right to view". The recipient may open the notification, delete, or ignore the notification. If the recipient deletes or ignores the notification, the system server will wait a pre-established period of time to provide the recipient with the opportunity to change their mind and accept the notification. At the end of the pre-configured period of time, the system server will remove all shards and all association with the original content effectively erasing the message before any party other than the recipient can successfully retrieve the message shards and reconstruct the message.

The notifications themselves can be stored in any haystack. To defeat the security on the message content an attacker would have to be sure they got the right notification, did they get the right shards, did they get all of the shards and in the right order, and does the attacker have the right encryption algorithm. In many interception cases and attacker attempts to determine if they have ended up with message content that conforms to a human language. The attacker knows that if they end up with words in a human language, such as, in a non-limiting example, English, the attacker is done with decryption, if the attacker ends up with an alphanumeric string they still won't know when if they are done with the decryption. Thus, the attacker cannot tell the decryption algorithm when to stop processing if they don't know they are done.

If the recipient accepts the notification, the notification may contain bits and clues that the recipient may use to retrieve the message intended for them. The recipient has a public key associated with a private key. The system encrypts the notification message with the public key of the intended recipient, where this public key is provided by the sender of the original content. The recipient is the only one with the private key to open and decode the message sent from the sender. The system will rotate public/private key pairs with every message. Thus, the public/private key pair is different for every single message. There is a root in time—but public/private key is salted with time. The system waits for a time cycle to generate a new encryption key pair. In effect, every message has a new public/private key pair. This is how the system protects the notification. Each notification is different for each message, but the notification contains enough information for the user to go and retrieve that message. Even if the attacker can determine when the decryption of the message shards is successfully completed, the attacker must obtain the private key of the recipient for the message content itself. However, there is never any transmission of a message that might contain a recipient's private key for a "man-in-the-middle" to intercept. This process negates such "man-in-the-middle" attacks because there is never any message sent, synchronously with the notification, that might contain a recipient's private key.

The reading process provides the recipient with a "right to view" which permits them to gather the shards from the "haystacks" and sub-directories and reverse the mathematical calculations to then reassemble and decode the original message. The notification to the recipient is decoded via the recipient's private key when the recipient clicks "view" the notification. The decoded notification then provides the instructions and information to enable the recipient to retrieve and reconstruct the message. The instructions and information provide the recipient with the ability to retrieve the shards from the cloud (haystacks).

All of the shards are gathered into the computer being used by the recipient. Upon successful retrieval of all shards associated with the message content, the intended message recipient may then reassemble the shards in the correct order using the information and instructions contained in the message notification transmitted from the system to the message recipient. Upon successful reassembly of the message shards, the message recipient may decrypt each of the shards utilizing the encryption algorithm specific to each shard. The encryption algorithm for each shard may be transmitted to the message recipient within the message notification.

Upon reassembly and reconstruction of the shards, the recipient will also have to decrypt the alphanumeric string that results from the shard decryption. The system may provide the recipient with the appropriate key and/or encryption algorithm to perform the decryption of the alphanumeric string into the original content, after which the recipient may view the message content using a browser on their computer. In the process of gathering the shards from each of the haystacks, the shards are deleted from each sub-directory and server upon retrieval. At the completion of the shard collection all message content has been deleted from the servers and no part of the message remains to be retrieved by a party that is not the recipient.

Turning now to FIG. 1, this figure presents a view of an exemplary system configuration consistent with certain embodiments of the present invention. In an exemplary embodiment, the combinatorial security platform is operating on a system server 100. The system server 100 maintains a bi-directional data communications connection with servers operational in the established cloud of networked system servers 102. Through the data communications connection, the system server 100 may connect to one or more servers 104 that are addressable utilizing the Internet Protocol (IP) as an enabling protocol for addressing the one or more servers 104 through the known IP address for each selected server 104. The system server 100 performs the steps of encoding and encrypting message content that a message sender wishes to provide to a message recipient 106. Upon the completing of the sharding and encryption steps, the system server 100 contacts a number of IP addressable servers 104 in the cloud 102, creates an unknown number of sub-directories on each IP addressable server 104, and stores the created shards in the created sub-directories in the selected IP addressable servers 104.

Upon completion of the distribution of the encrypted shards to the selected IP addressable servers 104, the combinatorial security platform transmits a "right to view" notification 108 to the intended recipient of the message content 106. The intended recipient of the message 106 will be provided with the directions, clues, and encryption keys and algorithms that will permit the recipient 106 to download the message shards to any computer 110 associated with the recipient 106. Once downloaded, the computer 110 may apply the received encryption keys and algorithms to reassemble, decrypt, and decode the message content. The message content may then be reviewed by the recipient 106 on any browser active on the recipient's computer system 110.

Figure 2:
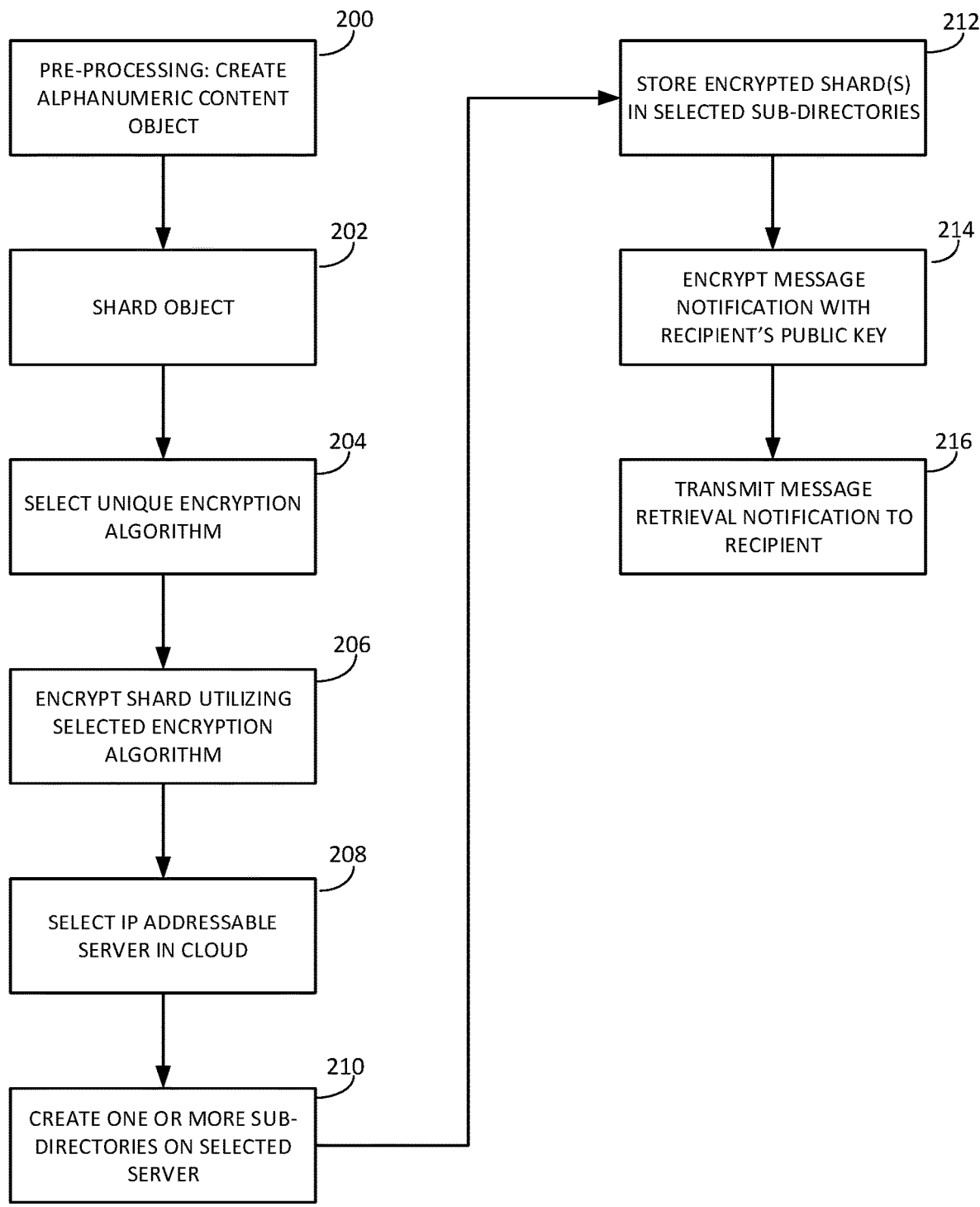
FIG. 2 is a view of the secure encoding of message content process flow consistent with certain embodiments of the present invention.

Turning now to FIG. 2, this figure presents a view of the secure encoding of message content process flow consistent with certain embodiments of the present invention. In an exemplary embodiment, the combinatorial security platform begins with the request from a sender to prepare a message for secure transmission to an intended recipient. At 200, the system receives the message content from the sender and begins by creating an alphanumeric content object from the message content received. At 202, the alphanumeric content object is split up into sub-portions of the whole of the message content. These sub-portions, referred to as "shards", may be of indeterminate length and the system may determine on an ad hoc, dynamic basis as to how many shards should result from the message content. Thus, the number of shards and the length of each individual shard is not determined according to a pre-configured business rule or algorithm, but instead the length and number of shards is different for each message and is calculated dynamically at the time the sharding operation is performed. At 204 the system creates and assigns a unique encryption algorithm for each shard, and the shard is encrypted utilizing a different, unique encryption algorithm for each shard. Each encryption algorithm is generated as a two-way mathematical algorithm that may be selected from a previously generated table of such algorithms, or may be generated dynamically at the time the system requires the encryption algorithm to apply the encryption to the designated shard. Thus, it can be seen that both a very large number of shards and an unlimited number of encryption algorithms may be generated to provide for secure encryption of the shards containing the message content. At 206, each shard is encrypted with the selected encryption algorithm.

At 208, the combinatorial security system server selects the IP address of an IP addressable server within the network cloud. The selection of an IP addressable server provides a destination upon which an indeterminate number of sub-directories will be created to establish that IP addressable server as a "haystack". At 210, the combinatorial security system server creates the dynamically determined number of sub-directories within the file system of the IP addressable server. At 212, the combinatorial security system server selects on an ad hoc basis a subset of the shards created from the message content to be placed within a plurality of the dynamically created sub-directories on the IP addressable server. The combinatorial security system server repeats the steps at 208, 210, and 212 until all shards containing the message content have been stored within determined sub-directories on a number of IP addressable servers. The combinatorial security system server stores and associates with each message all of the shard locations, encryption algorithms, and haystack identifiers for the message content distributed for each message transfer request from senders.

At 214, upon the completion of the distribution of all message shards, the combinatorial security system server creates a "right to view" message notification. The message notification may contain all of the information and encryption modalities that are required for the intended recipient of the message to retrieve and view the message content. The server then encrypts the message notification with the public key of a public/private encryption key pair of the message recipient specified by the sender. At 216, the combinatorial security system server transmits over a network communication channel the "right to view" message notification.

Figure 3:
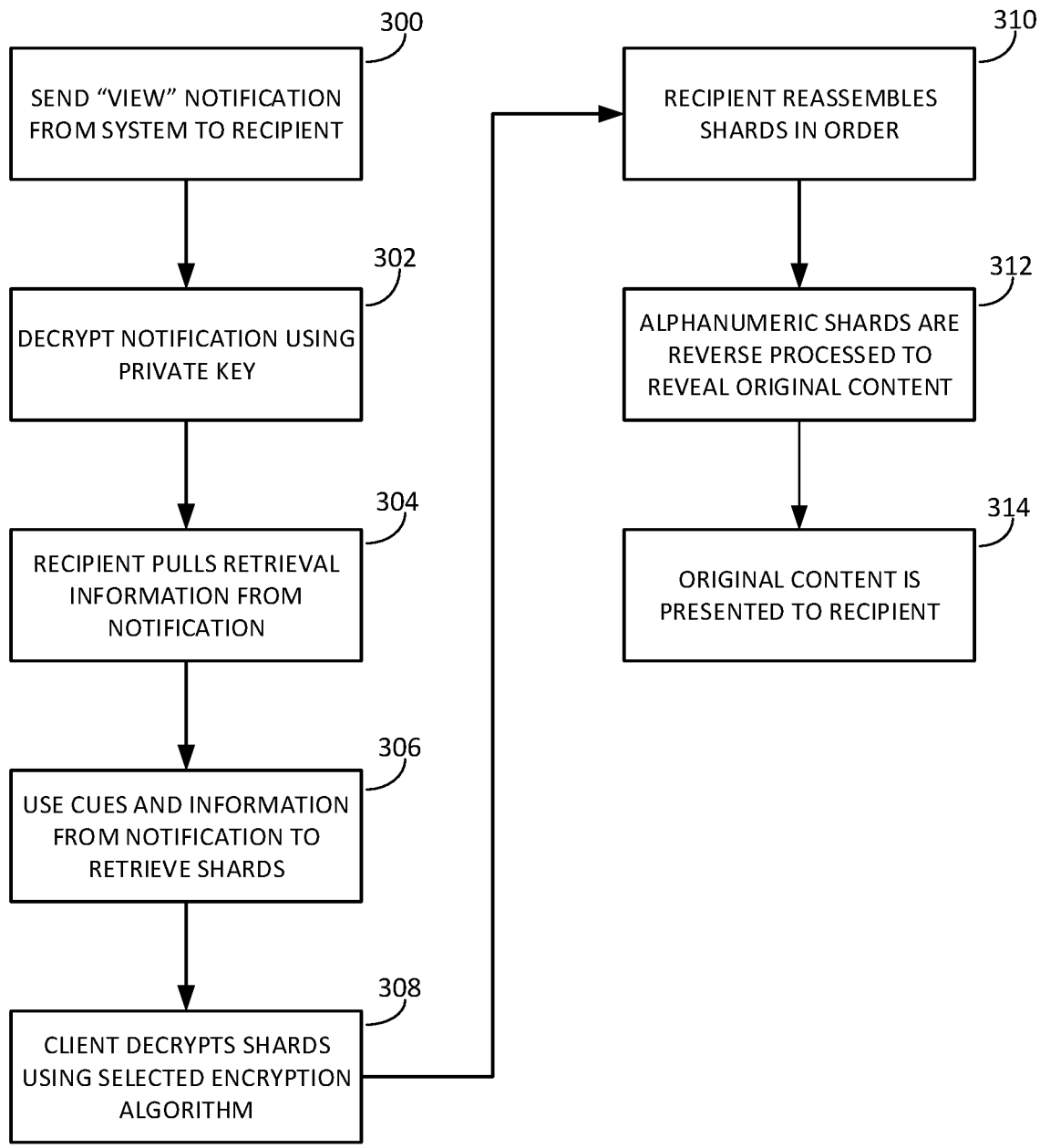
FIG. 3 is a view of the retrieval and decoding of message content process flow consistent with certain embodiments of the present invention.

Turning now to FIG. 3, this figure presents a view of the retrieval and decoding of message content process flow consistent with certain embodiments of the present invention. In an exemplary embodiment, at 300 the combinatorial security system server transmits the previously prepared "right to view" notification to the intended recipient of the message content as supplied by the sender. At 302, the intended recipient opens the "right to view" notification and utilizes the private key of the recipient's public/private key pair to decrypt the information contained in the "right to view" notification. At 304, the recipient imports the information, encryption algorithms, and other data contained within the notification into the computer system associated with the recipient. At 306, the recipient utilizes the location information to retrieve each shard from the "haystack" location where the shard has been stored. The notification also contains the encryption algorithm associated with each shard, the order into which the shards must be placed once decrypted, and the method for processing the resulting alphanumeric string back into the original message content.

At 308, the recipient uses the selected and received encryption algorithms and the identifiers as to which encryption algorithm is associated with which shard to decrypt the received shards. At 310, the recipient uses the received order information from the "right to view" notification to assemble the shards in the correct order. At 312, the recipient reverses the process to translate the alphanumeric string that has been decrypted and reassembled into the original message content. At 314, at the end of the processing steps, the original message content may be presented to the intended recipient in any browser the recipient may desire to use for viewing the message content.

While certain illustrative embodiments have been described, it is evident that many alternatives, modifications, permutations and variations will become apparent to those skilled in the art in light of the foregoing description.

What is claimed is:

1. A system for establishing communication security, comprising:
   a system data processor in communication with a user terminal;
   said system data processor transforming received message content into an alphanumeric data object;
   said system data processor splitting said alphanumeric data object into one or more data segments where each of said data segments is of variable length;
   said system data processor encrypting each data segment utilizing a different, unique encryption algorithm for each data segment;
   said system data processor selecting a plurality of networked servers utilizing Internet Protocol (IP) addressing;
   said system data processor creating one or more temporary directories within the file system of each of said plurality of selected networked servers;
   said system data processor storing each of the one or more encrypted segments within a different created directory of said one or more of the created directories within said plurality of selected networked servers;
   said system data processor transmitting an encrypted message notification to a user to alert said user that a message is available for retrieval, instructions for said retrieval, and containing a pre-configured time period within which the message must be retrieved by said user;
   said user directing a user data processor to retrieve said encrypted data segments from said created one or more directories by traversing each of said temporary directories to retrieve all data segments;
   said data processor removing the alphanumeric data object, all encrypted data segments, and all created temporary directories when the data segments have been retrieved and when the pre-configured time period has expired;
   the user data processor decrypting each of said retrieved data segments and combining all decrypted data segments to restore said alphanumeric data object;
   the user data processor transforming the alphanumeric data object to original message content and permitting the user to access said original message content for display and user interaction.

2. The system of claim 1, where said message content comprises any type of content, including text, video, audio, multimedia, data files, data directories, or any other type of content to be transmitted over networked communication channels.

3. The system of claim 1, where each data segment is of a different length that is not predetermined.

4. The system of claim 1, where each unique encryption algorithm is selected from a pool of unique encryption algorithms that are generated by the data processor.

5. The system of claim 1, where the data processor navigates to each IP addressable server in the cloud utilizing the IP address associated with that IP addressable server and opens a communication channel with that server.

6. The system of claim 5, creating at least one destination sub-directory within said one or more IP addressable servers.

7. The system of claim 6, where the data processor stores one message segment within each created destination sub-directory.

8. The system of claim 1, where the encrypted message notification contains the retrieval and decryption information for the message to be retrieved.

9. The system of claim 1, where the encrypted message notification is encrypted with a public key portion of a public/private encryption key pair that is associated with the user that is the intended recipient of the message content.

10. The system of claim 1, where the retrieved message content is displayed and the user interacts with the displayed message content within a browser display page.

11. A method for establishing communication security, comprising:
    a user terminal displaying a secure communication browser page;
    transforming received message content into an alphanumeric data object;
    splitting said alphanumeric data object into one or more data segments where each of said data segments is of variable length;
    encrypting each data segment utilizing a different, unique encryption algorithm for each data segment;
    selecting a plurality of networked servers utilizing Internet Protocol (IP) addressing;
    creating one or more temporary directories within the file system of each of said plurality of selected networked servers;
    storing each of the one or more encrypted segments within a different created directory of said one or more of the created directories within said plurality of selected networked servers;
    transmitting an encrypted message notification to a user to alert said user that a message is available for retrieval, instructions for said retrieval, and containing a pre-configured time period within which the message must be retrieved by said user;
    said user directing a user data processor to retrieve said encrypted data segments from said created one or more directories by traversing each of said temporary directories to retrieve all data segments;
    removing the alphanumeric data object, all encrypted data segments, and all created temporary directories when the data segments have been retrieved and when the pre-configured time period has expired;
    decrypting each of said retrieved data segments and combining all decrypted data segments to restore said alphanumeric data object; and transforming the alphanumeric data object to original message content and permitting the user to access said original message content for display and user interaction.

12. The method of claim 11, where said message content comprises any type of content, including text, video, audio, multimedia, data files, data directories, or any other type of content to be transmitted over networked communication channels.

13. The method of claim 11, where each data segment is of a different length that is not predetermined.

14. The method of claim 11, where each unique encryption algorithm is selected from a pool of unique encryption algorithms that are generated by the data processor.

15. The method of claim 11, where the data processor navigates to each IP addressable server in the cloud utilizing the IP address associated with that IP addressable server and opens a communication channel with that server.

16. The method of claim 15, creating at least one destination sub-directory within said one or more IP addressable servers.

17. The method of claim 16, where the data processor stores one message segment within each created destination sub-directory.

18. The method of claim 11, where the encrypted message notification contains the retrieval and decryption information for the message to be retrieved.

19. The method of claim 11, where the encrypted message notification is encrypted with a public key portion of a public/private encryption key pair that is associated with the user that is the intended recipient of the message content.

20. The method of claim 11, where the retrieved message content is displayed and the user interacts with the displayed message content within a browser display page.

* * * * *